United States Patent
Collins et al.

(10) Patent No.: US 6,513,567 B2
(45) Date of Patent: Feb. 4, 2003

(54) METHOD OF MAKING A SPRAY FORMED RAPID TOOL

(75) Inventors: David Robert Collins, Southgate, MI (US); John Michael Nicholson, Wayne, MI (US); Joseph A. Szuba, Dearborn, MI (US); Kevin Patrick Regan, Troy, MI (US); Richard L Allor, Livonia, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/737,157

(22) Filed: Dec. 13, 2000

(65) Prior Publication Data

US 2002/0069996 A1 Jun. 13, 2002

Related U.S. Application Data

(63) Continuation of application No. 09/186,032, filed on Nov. 4, 1998, now Pat. No. 6,257,309.

(51) Int. Cl.[7] .............................. B22D 23/00; B22C 9/04
(52) U.S. Cl. ........................... 164/46; 164/516; 164/34; 164/18; 164/19
(58) Field of Search ............................ 164/46, 516, 34, 164/325, 18, 19

(56) References Cited

U.S. PATENT DOCUMENTS

| | | | |
|---|---|---|---|
| 3,077,647 A | 2/1963 | Kugler | 164/19 |
| 3,631,745 A | 1/1972 | Walkey et al. | 164/19 |
| 5,073,589 A | 12/1991 | Milovich et al. | 524/439 |
| 5,147,002 A | 9/1992 | Hughes | |
| 5,439,622 A | 8/1995 | Pennisi et al. | |
| 5,561,901 A | 10/1996 | Stahley et al. | |
| 5,600,687 A | 2/1997 | Welsh | |
| 5,658,506 A * | 8/1997 | White et al. | 164/46 |
| 5,701,945 A * | 12/1997 | McKibben et al. | 164/325 |
| 5,718,863 A | 2/1998 | McHugh et al. | 164/309 |
| 5,817,267 A | 10/1998 | Covino et al. | 164/46 |
| 5,915,743 A | 6/1999 | Palma | |
| 5,967,218 A * | 10/1999 | Perganande et al. | 164/46 |
| 6,257,309 B1 * | 7/2001 | Kinane et al. | 164/46 |

FOREIGN PATENT DOCUMENTS

| | | |
|---|---|---|
| EP | 0 781 625 A1 | 7/1997 |
| EP | 1 038 987 A1 | 9/2000 |

* cited by examiner

Primary Examiner—Tom Dunn
Assistant Examiner—I.-H. Lin
(74) Attorney, Agent, or Firm—Damian Porcari

(57) ABSTRACT

A method of making a spray formed rapid tool includes the steps of making a model of a desired tool and constructing a ceramic pattern as the inverse of the model. The method also includes the steps of heating the ceramic pattern and thermally spraying a metal material against the ceramic pattern to form a desired tool.

20 Claims, 1 Drawing Sheet

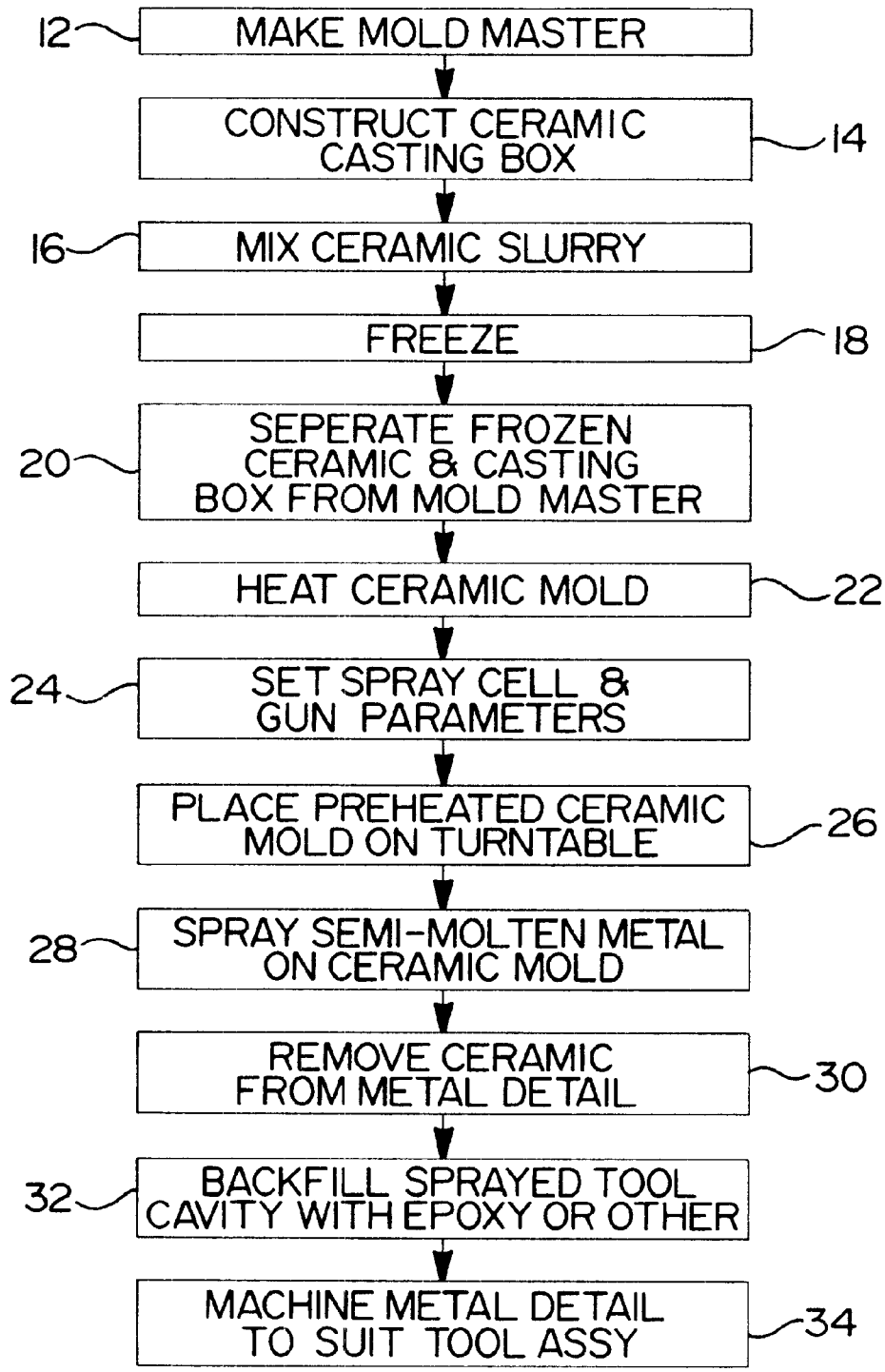

METHOD OF MAKING A SPRAY FORMED RAPID TOOL

The present application is a continuation of application Ser. No. 09/186,032, filed Nov. 4, 1998, now U.S. Pat. No. 6,257,309.

BACKGROUND OF THE INVENTION

1. Field of the Invention

The present invention relates generally to spray formed rapid tools and, more specifically, to a method of making a spray formed rapid tool.

2. Description of the Related Art

It is known to make a spray formed rapid tool. In spray forming, a master model of a desired tool is produced using a free form fabrication technique. This master model is then used to create a ceramic pattern, which is the reverse of the desired tool to be produced. The resulting ceramic pattern is the receptor onto which metal is sprayed to form a deposit in the shape of the desired tool.

Typically, the spray forming process uses a wire-arc spraying. In wire-arc spraying, electric current is carried by two electrically conductive, consumable wires with an electric arc forming between the wire tips. A high-velocity gas jet blowing from behind the consumable wires strips away the molten metal, which continuously forms as the wires are melted by the electric arc. The high-velocity gas jet breaks up or atomizes the molten metal into finer particles in order to create a fine distribution of molten metal droplets. The atomizing gas then accelerates the droplets away from the wire tips to the ceramic pattern where the molten metal droplets impact the ceramic pattern to incrementally form a deposit in the shape of the desired tool. The completed desired tool is then mounted and used to produce parts in conventional stamping, die casting, or molding process.

Although the above process for making a spray formed rapid tool has worked well, it suffers from the disadvantage that chip making with heat-treating is required to make the spray formed rapid tool. These steps are both laborious and time consuming. Therefore, there is a need in the art to make a spray formed rapid tool that would eliminate these steps.

SUMMARY OF THE INVENTION

Accordingly, the present invention is a method of making a spray formed rapid tool. The method includes the steps of making a model of a desired tool and constructing a ceramic pattern as the inverse of the model. The method also includes the steps of heating the ceramic pattern and thermally spraying a metal material against the ceramic pattern to form the desired tool.

One advantage of the present invention is that a method is provided of making a spray formed rapid tool at the same time the spray material is being deposited. Another advantage of the present invention is that the method of making a spray formed rapid tool shortens product development cycle time. Yet another advantage of the present invention is that the method eliminates chip making with heat-treating when forming a spray formed rapid tool. Still another advantage of the present invention is that the method reduces material loss. Yet a further advantage of the present invention is that the method improves yield, quality, and repeatability.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a schematic flow diagram of a method, according to the present invention, of making a spray formed rapid tool.

DESCRIPTION OF THE PREFERRED EMBODIMENT(S)

Referring to the drawings and in particular FIG. 1, one embodiment of a method, according to the present invention, of making a spray formed rapid tool is shown at 10. The method begins in block 12 and includes the step of creating or making a master model of a desired tool. Typically, the master model may be produced by using a CAD/CAM design and a free-form fabrication system such as stereo lithography. Such a process is disclosed in U.S. Pat. No. 5,658,506 to White et al., the disclosure of which is hereby incorporated by reference. It should be appreciated that the master model includes shrink factors, CNC machine references, and hand finishing.

After block 12, the method advances to block 14 and includes the step of constructing a ceramic casting box for the master model. To create the ceramic casting box, the bottom of the master model is adhered to a base plate (not shown) of an open box (not shown); the box is open at its top. It should be appreciated that brass pushoffs may be installed and the master model may be sprayed with a mold release.

Next, the method advances to block 16 and includes the step of mixing a desired ceramic slurry and pouring the ceramic slurry around the master model to form the ceramic pattern and completely covers its geometry to a thickness of greater than one (1) inch at the thinnest wall section. The method includes mixing a silica solution with wetting agent, adding wetting agent, adding alumina powder, and mix until blended. The method includes pouring the slurry into the casting box and vibrating the casting box and slurry contained therein on a table (not shown), preferably in a vacuum chamber (not shown), to minimize entrapped air.

The ceramic material for the ceramic pattern is selected to provide a good surface finish (such as 1–4 microns), good thermal shock resistance value at temperatures of 1800°–2400° F., able to withstand up to 2400° F. temperatures, have compressive strengths of about 9,000 psi and possess a low shrinkage (less than 0.3 percent) and possess low thermal expansion (1.0–4.0 E-6/degree F.) and have no reaction to molten metal. The ceramic material is selected to be capable of withstanding a molten metal environment and has a very smooth surface with good dimensional accuracy. The ceramic materials used include aluminum oxide ceramics, dental ceramics, investment casting slurries, fused silica and freeze cast alumina.

After block 16, the method advances to block 18 and includes the step of freezing the ceramic slurry to predetermined temperatures less than −31° F. for a predetermined time period such as greater than twelve hours. It should be appreciated that the step of freezing is used to remove moisture from the ceramic pattern.

Next, the method advances to block 20 and the includes the step of separating the frozen ceramic and casting box from the master model and removing the master model prior to the ceramic pattern thawing out. For example, the master model is removed from the cured ceramic pattern by installing screws (not shown) in the back of the master model and pulling the master model out physically. Alternatively, a stationary plate (not shown) may be used through which the extraction screws extend and the master model is removed by turning the screws inward to pull against the stationary plate and also pull the master model away from the ceramic pattern. It should be appreciated that the pushoffs may be used to separate the ceramic pattern from the master model.

After block 20, the method advances to block 22 and includes the step of heating the ceramic pattern. For example, the method includes drying the ceramic pattern for a predetermined time such as thirty-six hours at a predetermined temperature such as 122° F. and heating the ceramic pattern to a predetermined temperature such as 1472° F. in a predetermined time period such as eight hours. The ceramic pattern is then held at that predetermined temperature for another predetermined time period such as seven hours and allowed to cool to a lower predetermined temperature such as 585° F. and held there.

Next, the method advances to block 24 and includes the step of setting spray cell and gun parameters. For example, a robot motion program is loaded, gun voltages, gun amperages, and gun spray pressures are set for the robots (not shown) and spray guns (not shown) in a spray cell (not shown). The method then advances to block 26 and includes the step of placing the ceramic pattern on a turntable (not shown). The method includes rotating the turntable at predetermined speed such as one revolution per minute.

The method advances to block 28 and includes the step of thermally spraying a metal material against the ceramic pattern to form a spray formed rapid tool as the desired tool. Such step is desirably carried out by the wire arc process previously described. Another method to carry out the step of thermally spraying is the osprey process wherein a semi-solid slurry of hardenable metal material is sprayed from an induction heated nozzle supply and is impelled against the ceramic pattern with a high velocity due to the high-pressure gases that atomize the molten fluid. Metal droplets are formed from a melt that is atomized by gas (not from wire or powder). Continuous spraying is carried out to build up a layer that exceeds at least one quarter(3) inch in thickness, at its thinnest section. As the spray is applied and built up, the desired tool is formed. It should be appreciated that the method may include adjusting the gun parameters to maintain constant temperature.

Metals usable for this purpose include metals such as zinc and high temperature high strength carbon steel. These include certain tool steels such as A2 and plain carbon steel with (0.8% carbon by weight) as well as maraging steels. Maraging steels are difficult to machine and are seldom used for tooling, but can be readily spray formed to produce a desirable microstructure.

The density of the sprayed metal in accordance with this invention, will vary depending on the spray process used, but is generally between 95–99.5%. If the spray formed rapid tool 20 is made by the osprey process, the density will be 99.5% and if it is made by an arc spraying process such as twin arc, the density will be about 95%. The osprey process provides virtually no porosity in the as deposited metal because of the use of a semi-solid slurry that constantly feeds the solidifying metal material. The spraying process will result in little or no shrinkage because of such continuous feeding of deposited material. The osprey spraying process results in a finer microstructure.

Once the spray formed rapid tool is formed, the method advances to block 30 and includes the step of removing the ceramic pattern from the spray formed rapid tool. For example, the ceramic pattern may be removed by chipping with an air chisel, grit blasting, or high-pressure water using a water jet. Residual ceramic material may be removed with bead blasting. Next, the method advances to block 32 and may include the step of backfilling a cavity of the spray formed rapid tool with a material, preferably an epoxy such as an iron filled epoxy. It should be appreciated that the step of backfilling may not always be required.

After block 32, the method advances to block 34 and includes the step of machining details into the spray formed rapid tool to suit tool assembly. For example, the details can be formed by electro discharge machining (EDM), high pressure watering, grinding, polishing, plating, or etching into the spray formed rapid tool. The completed spray formed rapid tool may then be used in a die-set mold mounted in an injection-molding machine (not shown) and used to produce molded parts.

The present invention has been described in an illustrative manner. It is to be understood that the terminology, which has been, used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of making a spray formed rapid tool comprising the steps of:
    making a model of a desired tool;
    constructing a ceramic pattern as the inverse of the model;
    heating the ceramic pattern to a first predetermined temperature and cooling the ceramic pattern to a second predetermined temperature lower than the first predetermined temperature;
    thermally spraying a metal material against the ceramic pattern to form a desired tool; and
    separating the ceramic pattern from the desired tool.

2. A method as set forth in claim 1 including the step of machining details into the desired tool.

3. A method as set forth in claim 1 including wherein said step of separating the ceramic pattern from the desired tool comprises removing ceramic material from the metal material.

4. A method as set forth in claim 1 including the step of setting spray gun parameters and spray cell parameters prior to said step of thermally spraying.

5. A method as set forth in claim 1 including the step of placing the heated the ceramic pattern on a turntable prior to said step of thermally spraying.

6. A method as set forth in claim 5 including the step of rotating the turntable.

7. A method as set forth in claim 1 including the step of backfilling a cavity of the desired tool with material after said step of thermally spraying.

8. A method as set forth in claim 1 wherein said step of constructing the ceramic pattern comprises constructing a ceramic casting box and attaching the model to the ceramic casting box.

9. A method as set forth in claim 8 including the step of mixing a ceramic slurry and pouring the ceramic slurry over the model and into the ceramic casting box.

10. A method as set forth in claim 1 including the step of separating the ceramic pattern from the model.

11. A method as set forth in claim 10 including the step of freezing the ceramic pattern prior to said step of separating the ceramic pattern from the model.

12. A method of making a spray formed rapid tool comprising the steps of:

making a model of a desired tool;

constructing a ceramic pattern as the inverse of the model;

freezing the ceramic pattern;

separating the ceramic pattern from the mold;

heating the ceramic pattern to a first predetermined temperature and cooling the ceramic pattern to a second predetermined temperature lower than the first predetermined temperature;

thermally spraying a metal material against the ceramic pattern to form a desired tool; and separating the ceramic pattern from the desired tool.

13. A method as set forth in claim 12 including the step of setting spray gun parameters and spray cell parameters prior to said step of thermally spraying.

14. A method as set forth in claim 12 including the step of placing the heated the ceramic pattern on a turntable prior to said step of thermally spraying.

15. A method as set forth in claim 14 including the step of rotating the turntable.

16. A method as set forth in claim 12 including the step of backfilling a cavity of the desired tool with material after said step of thermally spraying.

17. A method as set forth in claim 12 including the step of machining details into the desired tool.

18. A method as set forth in claim 12 wherein said step of constructing the ceramic pattern comprises constructing a ceramic casting box and attaching the model to the ceramic casting box.

19. A method as set forth in claim 18 including the step of mixing a ceramic slurry and pouring the ceramic slurry over the model and into the ceramic casting box.

20. A method of making a spray formed rapid tool comprising the steps of:

making a model of a desired tool;

constructing a ceramic pattern as the inverse of the model by constructing a ceramic casting box, attaching the model to the ceramic casting box, mixing a ceramic slurry, and pouring the ceramic slurry over the model and into the ceramic casting box;

freezing the ceramic pattern;

separating the ceramic pattern from the mold;

setting spray gun parameters and spray cell parameters;

heating the ceramic pattern to a first predetermined temperature and cooling the ceramic pattern to a second predetermined temperature lower than the first predetermined temperature;

placing the heated the ceramic pattern on a turntable and rotating the turntable;

thermally spraying a metal material against the ceramic pattern to form a desired tool and separating the ceramic pattern from the desired tool;

backfilling a cavity of the desired tool with material; and machining details into the desired tool.

* * * * *